United States Patent [19]

Kee

[11] 4,074,295
[45] Feb. 14, 1978

[54] COMPACT ACCESSORY STROBE FOR CAMERAS WITH BATTERY ENCLOSED FILM PACK

[75] Inventor: Richard C. Kee, Chestnut Hill, Mass.

[73] Assignee: Polaroid Corporation, Cambridge, Mass.

[21] Appl. No.: 679,698

[22] Filed: Apr. 23, 1976

[51] Int. Cl.² .............................................. G03B 15/05
[52] U.S. Cl. ........................................ 354/145; 354/34
[58] Field of Search ...................... 354/32, 33, 35, 141, 354/143, 145

[56] References Cited

U.S. PATENT DOCUMENTS

| 3,296,949 | 1/1967 | Bounds | 354/145 X |
| 3,473,456 | 10/1969 | Ivester | 354/35 |
| 3,559,548 | 2/1971 | Ackerman | 354/141 |
| 3,943,532 | 3/1976 | Filippis | 354/145 X |

OTHER PUBLICATIONS

"Electronic Flash Unit . . .," 13219, Kodak Research Disclosure, Apr. 1975.

Primary Examiner—L. T. Hix
Assistant Examiner—M. L. Gellner
Attorney, Agent, or Firm—Edward S. Roman

[57] ABSTRACT

A compact strobe is adapted for direct connection to a Polaroid SX-70 Land Camera or the like. Once the strobe is connected to a film laden camera, it is provided with a steady state input voltage which can be utilized by the strobe to charge a storage capacitor. The storage capacitor may thereafter be triggered at an appropriate time during the camera exposure interval by a select trigger signal, also furnished from the camera, to discharge through a flash tube thereby providing a source of artificial illumination. Connection from the camera to the strobe is made from the flash array receiving socket on top of the camera exposure housing as well as from the remote actuator button socket on the side of the camera exposure housing. To accommodate this connection, the strobe is provided with both a blade connector similar to that utilized on a conventional multi-lamp flash array and a flexible electrical connecting member for connecting directly to the remote actuator button socket.

9 Claims, 4 Drawing Figures

COMPACT ACCESSORY STROBE FOR CAMERAS WITH BATTERY ENCLOSED FILM PACK

BACKGROUND OF THE INVENTION

1. Field of the Invention

The present invention relates to a strobe arrangement for use with Polaroid SX-70 type Land Cameras and more particularly to a strobe arrangement which is both powered and triggered from an SX-70 type camera upon attachment thereto.

2. Description of the Prior Art

The Polaroid SX-70 Land Camera, made and sold by the Polaroid Corporation of Cambridge, Massachusetts, U.S.A., is adapted to make photographs automatically either by ambient light or with the aid of a flash lamp array. For this purpose, the camera is provided with an accessory socket in the shutter and lens board housing which will accept a part from a flash lamp array. The flash lamp array includes five flash lamps in one array and five in another so that five sequential exposures can be made, each with a different bulb, when the array is inserted in the socket in either position. The remaining five lamps can be sequentially used by removing the flash array, and putting it back in facing the opposite direction.

The camera is provided with a sequencing circuit to select the next unfired bulb for energization, and to sequence the camera circuits which operate the shutter, control the mirror and operate the processing rolls.

It would be highly desirable to extend the capabilities of the Polaroid SX-70 Land Camera, and other cameras such as the new Polaroid Pronto Camera, for use with electronic flash. One type of strobe suitable for use with Polaroid's SX-70 Land Cameras as disclosed in a U.S. Pat. No. 3,943,532 entitled "Flash Attachment for Self Developing Collapsible Cameras", issued Mar. 9, 1976 teaches the use of a flash lamp attachment having a flash tube and reflector assembly connected to a separate power pack unit which is removable from the camera body. The power required for igniting the flash lamp is provided by a separate disposable battery contained within a large auxiliary power pack unit that releasably attaches to the bottom of the SX-70 camera. However, such an auxiliary power pack unit is bulky and heavy and not particularly compatible with the SX-70 camera's compact design features.

Thus it is a primary object of this invention to provide a compact strobe arrangement for use with Polaroid's SX-70 Land type cameras wherein the strobe receives both a trigger pulse signal and a charging current directly from the camera furnished by way of the SX-70 film pack battery.

It is a further object of this invention to provide a compact strobe adapted for connection to conventional SX-70 Land Cameras so as to receive both a charging current and a trigger signal from the SX-70 camera without requiring modification to the camera.

Other objects of the invention will in part be obvious and will in part appear hereinafter. The invention accordingly comprises the mechanism and system possessing the construction, the combination of elements and arrangement of parts which are exemplified in the following detailed disclosure.

SUMMARY OF THE INVENTION

The invention relates to an electronic flash unit for use with a camera of the type having a flash socket assembly adapted for receipt of a conventional multiple flash lamp array together with an electrical receiving socket spaced apart from the flash socket for accommodating the connection of a conventional remote actuator button. The flash unit comprises a housing, a storage capacitor and means responsive to an applied voltage for charging the capacitor. Circuit means are also provided to respond to an applied trigger signal for discharging the capacitor through the discharge tube to produce an illuminating flash of light. A connector blade extends outward from the strobe housing and is adapted for receipt within the camera flash socket assembly. The connector blade includes at least three spaced apart terminal elements of which two terminal elements are arranged to receive an applied trigger signal from the camera and of which the third terminal element is arranged to receive one side of an applied voltage from the camera for charging the capacitor. Means are provided for respectively electrically connecting the trigger signal receiving terminal elements to the means for discharging the capacitor and for electrically connecting the applied voltage receiving terminal element to the means for charging the capacitor. A flexible electrical connecting member extends outward from the strobe housing and connects to an electrical insertion jack adapted for receipt within the camera receiving socket to receive the other side of the applied voltage from the camera for charging the capacitor. Means are also provided within the housing for electrically connecting the flexible member to the means for charging the capacitor.

BRIEF DESCRIPTION OF THE DRAWINGS

The novel features that are considered characteristic of the invention are set forth with particularity in the appended claims. The invention itself, however, both as to its organization and its method of operation, together with other objects and advantages thereof, will be best understood from the following description of the illustrated embodiment or when read in connection with the accompanying drawings or when like members have been employed in the different figures to note the same parts and wherein:

DESCRIPTION OF THE PREFERRED EMBODIMENT

Figure 1:
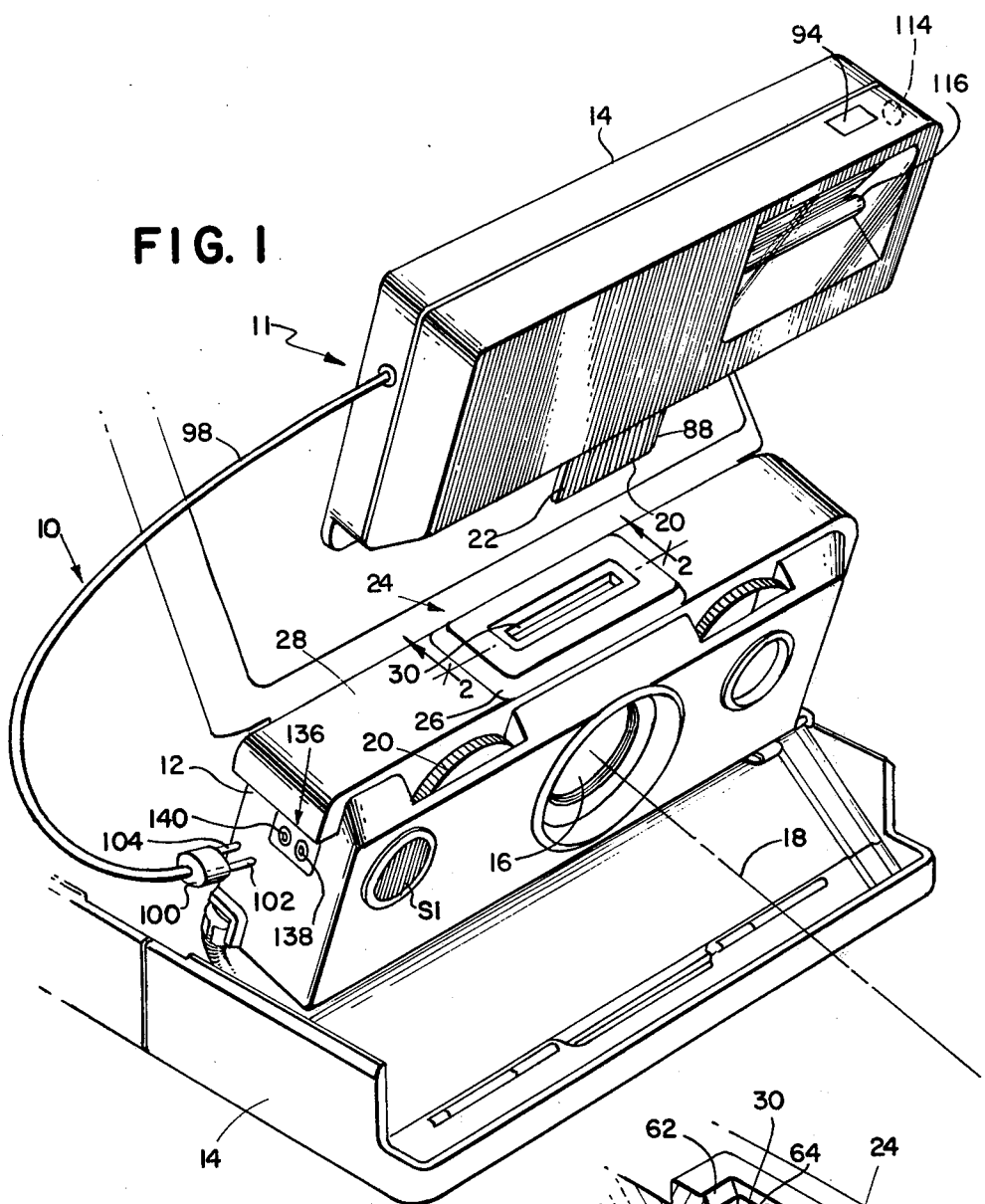
FIG. 1 is an exploded partial perspective view of the strobe arrangement of this invention in combination with a camera apparatus.

Referring now to FIG. 1 there is shown a front portion of a folding Polaroid SX-70 Land camera 10 of the type more fully shown and described in U.S. Pat. Ser. No. 3,820,128 by J. Burgarella et al. entitled "Flat Photographic Control System" issued June 25, 1974 and assigned in common herewith. Camera 10 is illustrated as including a shutter housing section 12 mounted to pivot into a face down position on a housing section 14 when the camera is folded for storage. Housing section 12 includes a lens and shutter assembly 16 which may be of the type shown in U.S. Pat. No. 3,200,723 having a picture taking axis 18, a focus wheel 20 for focusing the lens and an actuator button S1 for initiating the exposure cycle of the camera. Housing section 12 further includes a flash socket assembly 24 having a boss 26 which extends through a wall 28 of shutter housing section 12 and defines an entrance slot 30 which is orthogonal to picture taking axis 18 for receiving the connector blade 72 of either a disposable multilamp flash assembly as shown generally at 68 in FIG. 3, or alternatively the connector blade 88 of a strobe unit 11 shown in FIG. 1.

Figure 2:
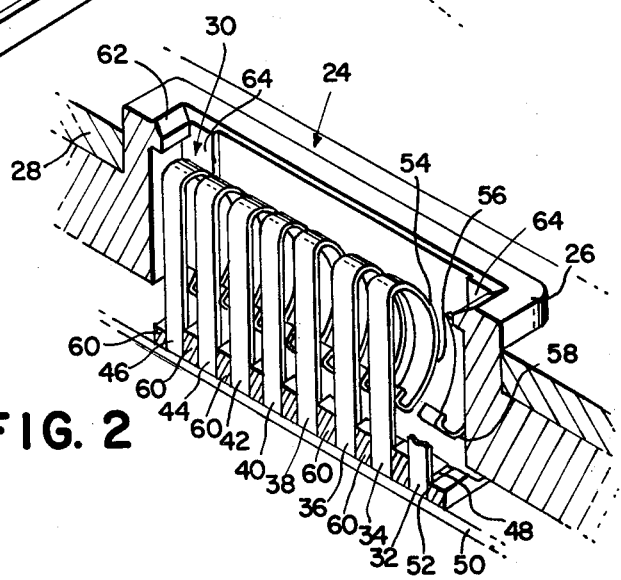
FIG. 2 is a cutaway perspective view of a portion of the camera of FIG. 1.

Referring now to FIG. 2, the flash socket assembly 24 is shown to include a first set of contacts or terminal strips 32, 34, 36, 38, 40 and 42 and a second set of contacts or terminal strips 44 and 46. Each of the contacts is preferably composed of a spring material having high electrical conductivity and high tensile strength such as certain berryllium copper alloys. A nickel silver coating is preferably applied to the contact to minimize contact resistance. Each of the contacts includes a base section 48 for connection to leads on a printed circuit substrates 50, a spine 52, and a reverse bent section including an entrance ramp portion 54, a contact portion 56, and an exit ramp portion 58. The entrance and exit ramp portions 54 and 58 assure a smooth insertion and withdrawal of the connector blade. The contact portions 56 apply a loading force on the contiguous surface of the connector blade in a direction normal to the plane of the connector blade from either a multilamp flash assembly or strobe unit so as to retain the blade in the socket assembly, and so as not to introduce any lifting force component which might tend to raise the connector blade from the socket assembly. Spacing means 60 are interdigitated with the contacts to maintain the parallel relationship between the contacts and to prevent a contact from moving into electrical engagement with an adjacent contact. Socket assembly 24 also includes an outwardly beveled mouth 62 surrounding slot 30 and walls 64 which guide the connector blade into its operative position within the socket assembly.

Figures 3, 4:
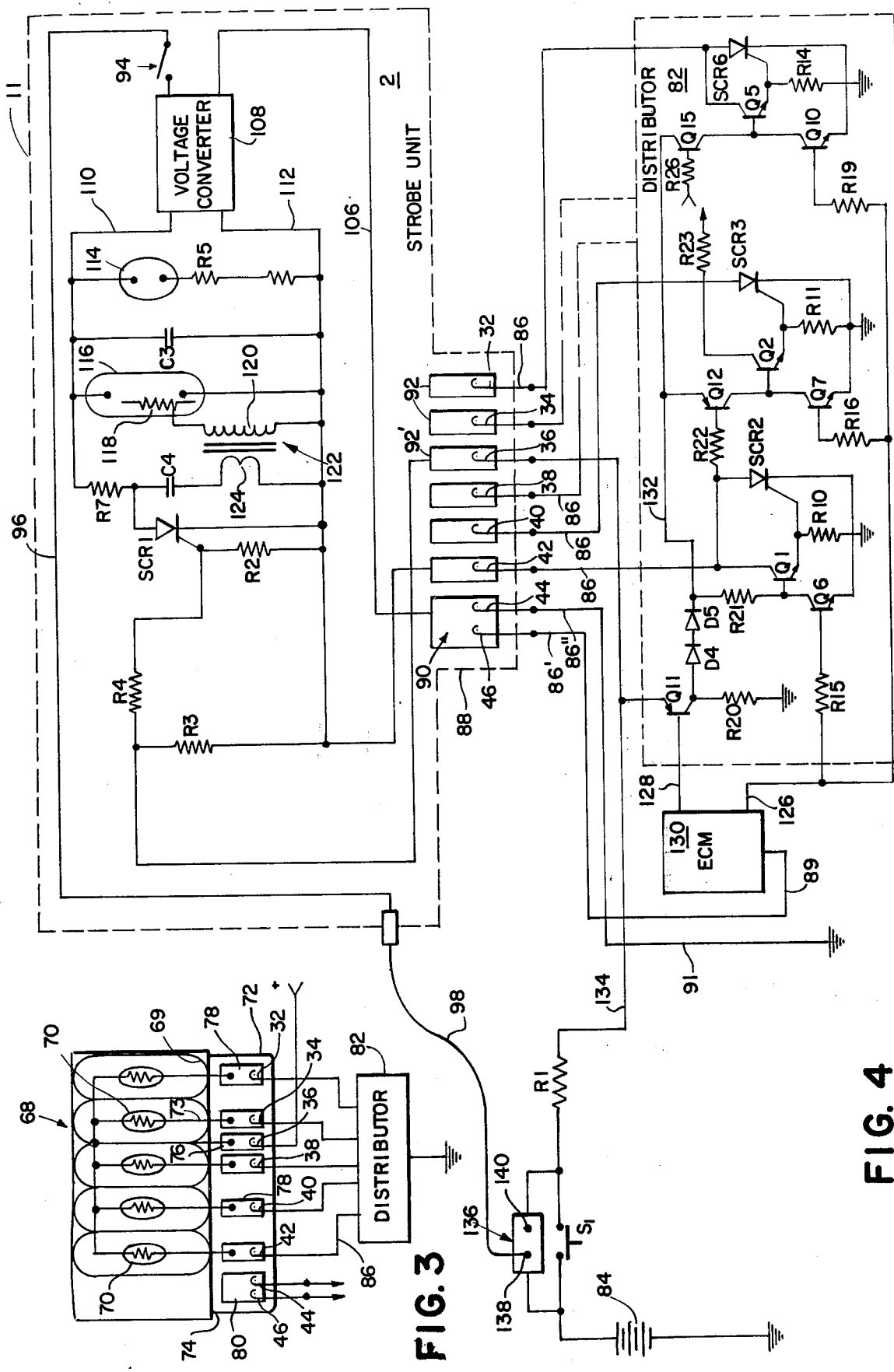
FIG. 3 is a schematic diagram of a portion of the camera of FIG. 1 in combination with a multilamp flash assembly.
FIG. 4 is a schematic diagram of the control circuitry for the camera of FIG. 1 in combination with the strobe circuitry for the strobe in FIG. 1.

As schematically indicated in FIG. 3, the conventional multilamp flash assembly or array 68 may comprise an insulating block or support section 74 supporting 5 reflectors 69 comprising reflective recesses in which each of a series of 5 flashlamps 70 is mounted. Five additional flash lamps are similarly disposed on the opposite side of the flash assembly 68. Each of the flashlamps 70 has one terminal connected to a common terminal 76 formed as a conductive strip on connector blade 72 of insulated material that is adapted to fit into the socket of assembly 24. Each of the flashlamps 70 has a second terminal connected to a different one of a set of 5 output terminals 78, also formed as conductive strips on the connector blade 72.

Upon insertion of the connector blade 72 of the flash array 68 within the flash socket assembly 24 of FIG. 1, the second terminals 78 make respective electrical contact with the socket terminal strips 32 through 42. The terminal strips 32 through 42, in turn, are connected to a distributor or flash sequencing circuit schematically indicated at 82. Generally, in response to an input trigger signal supplied to the distributor circuit 82 in a manner to be subsequently described in greater detail, the distributor circuit operates to effectively connect one of the terminals 78 selected in a predetermined sequence to a ground terminal. The common terminal 76 is also connected to the positive supply terminal of a battery shown schematically at 84 in a manner to be subsequently described. The battery 84 is preferably insertable within the folding camera 10 in correspondence with the film pack or cassette in a manner as is well known in the art for Polaroid SX-70 type film cassettes and cameras. The distributor circuit 82 operates in a manner to be subsequently described to selectively ground the terminal 78 connected to the first unfired flashbulb 70 in an ordered sequence in the array so that when one of the terminals 78 is grounded current flows through the associated flashlamp 70.

The connector blade 72 is provided with a relatively wide terminal 80 that bridges the pair of terminal strips 44 and 46 upon insertion of the connector blade 72 within the socket assembly 24. Electrically shorting terminal strips 44 and 46 operate to signal the camera circuit that the flash array is in position in the camera and ready to be used.

Referring now to FIG. 4 there are shown the details of the strobe unit 11 adapted to cooperate with the camera of FIG. 1, together with a particular form of distributor network 82 adapted to cooperate with an electronic control module (ECM) 130, the details of which may be more readily understood from U.S. Patent Ser. No. 3,820,128, supra, together with U.S. Patent Ser. No. 3,930,184 entitled "Electronic Flash Coupling System For Sequential Flashbulb Firing Circuit" by C. Biber issued Dec. 30, 1975 and assigned in common herewith. More specifically, strobe unit 11 includes connector blade 88 on which there is provided a wide terminal 90, corresponding to the terminal 80 in FIG. 3. Five terminals 92 are also provided corresponding to the terminals 78 in FIG. 3 and one terminal 92' is provided corresponding to the common terminal 76 in FIG. 3. As will be readily apparent, only one of the five terminals 92 is electrically necessary and the other terminals may be omitted if desired. The wide terminal 90 of the strobe connector blade 88 is adapted to electrically connect the terminal strips 44 and 46 thereby enabling the electronic control module 130 by providing its sole connection to the ground terminal of battery 84 through lines 89 and 91 which are electrically connected in serial relation through terminal strips 44 and 46 and wide terminal 90.

One of the terminals 92, here shown as the one adjacent wide terminal 90, is connected to the common terminal 92' by way of a resistor R3 which corresponds to the impedance of an unfired flashlamp for reasons which are more fully apparent in U.S. Patent Ser. No. 3,858,227 entitled "Adaptor Apparatus For Flash Firing System" by S. Ellin et al. issued Dec. 31, 1974 and assigned in common herewith. Thus, the resistor R3 preferably has a value in the order of 4 ohms, approximately the resistance of a flashlamp before it is fired. Connected in parallel with the resistor R3 is a current limiting resistor R4 in serial connection to a gate resistor R2.

The strobe unit 11 is also adapted to receive an external substantially steady state DC battery voltage from the lines 96 and 106 for powering a conventional voltage converter 108. There may also be provided an on-off switch 94 by which the user may control the power connection to the voltage converter 108. The voltage converter 108 operates in a conventional manner to convert the DC voltage, as may be derived from battery 84 which is preferably 6 volts, to a suitable strobe operating voltage such as 350 volts. This voltage appears on a pair of output terminals or lines 110 and 112 from the voltage converter 108.

The first circuit path across the output terminals 110 and 112 includes a series ready-light 114, and a resistor R5 in series therewith. The ready-lamp 114 may be a conventional gas discharge lamp of any suitable design. The resistor R5 is selected to limit the current flowing through the lamp 114 to a suitable value. A second path across the leads 110 and 112 comprises a storage capacitor C3 in a suitable size for storage of the energy necessary to fire a gas tube 116. The gas tube 116 has electrodes connected across the leads 110 and 112 in the third path. The tube 116 is triggered to produce a flash of light when the capacitor C3 is sufficiently charged to allow the lamp 114 to glow and a relative high voltage spike, such as 5,000 volts is applied to the grid terminal 118 of the tube 116.

The grid 118 is connected to the lead 112 through the high voltage secondary winding 120 of a pulse transformer generally designated at 122. The low voltage primary winding 124 of the transformer 122 has one terminal connected to the lead 112 and a second terminal connected through a capacitor C4, in series with a resistor R7, to the lead 110. A silicon controlled rectifier SCR1 has its anode terminal connected to the junction of the resistor R7 and the capacitor C4 and its cathode connected to the lead 112. Resistor R2 is connected between the gate and the cathode of the silicon controlled rectified SCR1 to prevent false triggering of the controlled rectifier.

In order that the strobe unit 11 be made as compact as possible, it is desired that the voltage converter 108 be powered directly from the camera battery 84. It is toward this end that the instant invention is directed as will become more readily apparent from the following discussion. During operation of the strobe unit 11 when the switch 94 is closed, the capacitors C3 and C4 will be charged. When the charge is adequate to develop a suitable flash of light for exposure, the ready lamp 114 will discharge and glow, indicating that the strobe unit is ready for use. Thereafter an appropriate input signal applied to the terminals 92 and 92' by the distributor circuit 82 will operate to gate the silicon controlled rectifier SCR1 into conduction, causing discharge of the capacitor C4 through the primary winding 124 of the transformer 122, resulting in a triggering spike being applied to the grid 118 of the flashtube 116 to cause it to discharge and produce a flash. Discharge of the capacitor C3 through the tube 116 will cause the ready light 114 to be extinguished. With the discharge of the capacitor C4, ringing in the discharge circuit will cause a momentary reversal of voltage sufficient to cutoff the silicon controlled rectifier SCR1.

The distributor circuit 82 comprises 5 electronic switches, hereshown as an ordered array of silicon controlled rectifiers SCR2 through SCR6. Of these, only the first silicon controlled rectifier SCR2 in the sequence, the second SCR3, in the last SCR6, are shown. The stage comprising the switch SCR3 is typical of the storage stages comprising the receifiers SCR4 and SCR5, not shown.

The anode terminals of the silicon controlled receifiers SCR2 through SCR6 connect respectfully to the terminal strips 32 through 42 with all the cathode terminals connecting to ground. Each of the gates of the controlled rectifiers SCR2 through SCR6 is connected to ground through a different one of a set of resistors R10 through R14 of which only the resistors R10, R11 and R14 are shown. Each of the controlled rectifiers SCR2 through SCR6 has its anode connected to the collector of a different one of a set of 5 gate control NPN transistors Q1 through Q5. The emitter of each of the transistors Q1 through Q5 is connected to the gate of a different one of the controlled rectifiers SCR2 through SCR6. The base of each of the transistors Q1 through Q5 is connected to the collector of a different one of a set of 5 inhibit NPN transistors Q6 through Q10. The emitter of each of the transistors Q6 through Q10 is grounded with respect to the battery 84. The base terminals of transistors Q6 through Q10 are each connected through a different one of a series of current distributing resistors R15 through R19 to an output terminal 126 from the electronic control module 130. When the electronic control module 130 provides a positive voltage signal corresponding to a logic 1 at output terminal line 126, each of the transistors Q6 through Q10 is gated into conduction thereby preventing any of the transistors Q1 through Q5 from being biased into conduction. The electronic control module 130 also provides a trigger signal at output terminal line 128 to the base of a PNP transistor Q11. The emitter terminal of transistor Q11 is connected to the positive voltage side of the battery 84 by way of a resistor R1 and the actuator button S1. Thus, the emitter terminal of transistor Q11 receives a positive potential from the battery 84 when the button S1 is depressed. The collector of transistor Q11 is returned to ground through a resistor R20. The collector of transistor Q11 also connects to a lead 132 through a pair of diodes D4 and D5 in series.

The lead 132 is connected to the base terminal of the transistor Q1 through a resistor R21. The lead 132 is also connected to the emitters of a group of 4 logic PNP transistors Q12 through Q15, of which only the transistors Q12 and Q15 are shown. The collectors of the transistors Q12 through Q15 are connected to the bases of the transistors Q2 through Q5, respectively.

The base of the transistor Q12 is connected to the anode of the controlled rectifier SCR2 through a resistor R22. A similar resistor R23 connects the anode of the controlled rectifier SCR3 to the next stage transistor Q13, not shown. Other stages are similarly connected, e.g., the base of the transistor Q15 is connected to one terminal of a resistor R26, and the other terminal of the resistor R26 is connected to the anode of the controlled rectifier SCR5, not shown.

Referring now to FIG. 3 in conjunction with FIG. 4 it can be seen that the distributor circuit 82 is designed to fire each lamp in order from first to last. This is accomplished by having each switching circuit receive a trigger signal only when the preceding flash lamp is open circuited. Assuming that none of the flashlamps have been fired and that the distributor circuit 82 is triggered at the appropriate time by the electronic control module 130, which appropriate time is generally programmed to occur when the shutter is fully open in response to depression of actuator button S1 as fully disclosed in U.S. Patents Ser. Nos. 3,930,184 and 3,820,128, supra. The appropriate trigger signal from the electronic control module 130 provides a zero or negative potential signal at output terminal line 126 so as to maintain the inhibit transistors Q6 through Q10 in a nonconducting state while a negative going pulse is provided at the output terminal line 128 to gate transistor Q11 into conduction. Turning on transistor Q11 operates to render gate control transistor Q1 conductive so as to switch on SCR2 thereby effectively coupling the first lamp 70 across the battery 84 supplied voltage so as to fire the lamp. As the lamp 70 is initially supplied with current and begins to flash, SCR3 will not turn on because its gate control transistor Q2 remains in a nonconductive state. The latter falls from the fact that its associated logic transistor Q12 is not rendered conductive. That is, the voltage across the emitter-base junction of the transistor Q12 is substantially identical to the voltage across the flashing lamp and the latter voltage is low in as much as the initial filament resistance is also very low. It should be readily appreciated, however, that if the lamp filament heats up, its resistance increases (just prior to opening of the filament) and the voltage across the lamp will accordingly increase. However, the electronic control module 130 operates to turn on inhibit transistors Q6 through Q10 so that subsequent circuits cannot turn on at this latter time during flashing of a preceding lamp. Thus, once the firing of a particular bulb is initiated, a high level in each signal is provided from the distributor circuit 82 for feedback through the electronic control module 130 so that the distributor circuit 82 is clamped off so as to prevent additional lamp firing at that time as is more fully described in U.S. Patent Ser. No. 3,930,184, supra.

Following the firing of the first lamp, when a subsequent trigger signal is received from the electronic control module 130 the first SCR2 will be in a conductive state and the voltage across the first open lamp is high so that the voltage across the transistor Q12 will exceed the threshold voltage necessary to turn on this transistor. The latter, in turn, provides a suitable gating signal to the second SCR3 through gate transistor Q12 so as to draw ignition current through the second lamp. However, during initiation of current through the second lamp, the following SCRs will not be turned on in as much as transistor Q13 (not shown) is in parallel with the conducting line, and hence, is not biased for conduction.

Assuming now that the strobe unit 11 of FIG. 4 is inserted into the flash socket assembly 24, camera operation will procede in like manner with the electronic control module 130 providing a negative trigger signal at terminal line 128 thereby forward biasing the emitter-base junction of transistor Q11. At the same time, a zero potential or negative potential signal is provided at output terminal line 126 to simultaneously turn off transistors Q6 through Q10. The diodes D4 and D5 operate to drop the voltage to the emitters of transistors Q12 through Q15 so that they are below the potential at their associated base terminals when the controlled rectifier SCR2 is nonconducting. This effect, however, is not important to the operation of the strobe unit 11 but, however, is significant to the operation of the linear flash lamp array 68 as previously discussed. The pulse of increased potential across the lead 132 will operate to bias the transistor Q1 into conduction causing the potential across the resistor R10 to rise, and supply gate current to turn on the controlled rectifier SCR2, which will then go into avalanche conduction. Current will now flow through the resistors R3 in parallel with R2 and R4 thereby gating the controlled rectifier SCR1 into conduction. Assuming that the capacitors C3 and C4 are charged, with the SCR1 conducting, the capacitor C4 will discharge, causing the pulse transformer 122 to gate the gas tube 116 into conduction to produce a light flash.

As previously discussed strobe unit 11 is adapted to receive charging current from the battery 84 situated within the folding camera 10 as shown in FIG. 1. The battery 84 is preferably of a type, which is carried in a Polaroid SX-70 Land Film Pack as manufactured and sold for use in the Polaroid SX-70 Land Camera. Once the battery 84 is inserted within the SX-70 camera, the positive and negative terminals are automatically contacted to power circuitry and equipment within the camera 10. Such an arrangement was neither designed nor intended for use with the type of compact strobe unit as shown in FIG. 4. Fortunately, the ground terminal from the battery is in direct electrical connection with the line 91 so as to provide a direct ground connection to terminal element 44. Thus, line 106 from voltage converter 108 in strobe 11 connects directly to the wide terminal 90 thereby accommodating a direct electrical connection from the strobe unit 11 to the battery ground terminal when the connector blade 88 is inserted within the flash socket assembly 24. Connection from the voltage converter 108 to the positive terminal of the battery 84, however, is more difficult because as is readily apparent none of the terminal strips 32 through 46 connect directly to the positive voltage side of the battery 84. Terminal strip 36 may be indirectly connected to the positive side of the battery 84 by way of the resistor R1 and button S2, however, this arrangement has proved unsatisfactory due to the high current drawn by the voltage converter 108 which may damage resistor R1.

Referring now to FIGS. 4 and 1 there is shown an electrical receiving socket 136 having two spaced apart female type receiving chambers 138 and 140 in the side of shutter housing section 12. The electrical receiving socket 136 is in parallel electrical connection with respect to the actuator button S1 and accommodates the insertion of a complementary jack connecting to a remote actuator button S1 so that the camera may be remotely operated in a known manner.

The voltage converter 108 of the strobe unit 11 may thus be connected to the positive terminal of the battery 84 by way of the line 96 which serially connects to a flexible electrical connecting member 98. The outside end of the flexible member 98 terminating in an electrical insertion jack 100 having two spaced apart male prong members 102 and 104 which are adapted for insertion within the electrical receiving socket 136 in the side of the shutter housing section 12. As is readily apparent, the electrical connecting member 98 connects to only one of the prong members 102 or 104 of the jack 100 so as not to short out the button S1 and thereby actuate the camera. Thus, in this manner is the strobe unit 11 arranged to provide a direct connection to the positive and negative terminals of the battery 84 within the folding camera 10 while also receiving a synchronizing signal also generated within the camera 1o to fire the flash tube 16. Connecting member 98 is preferably made sufficiently short and integrally molded with jack 100 so as to require a substantial twist of the member 98 by the user in order to insert the jack 100 with the prongs 102, 104 improperly reversed.

Whereas the camera 10 is herein described as being a Polaroid SX-70 Land Camera, it will be readily understood that the invention is by no means so limited and may be applicable to other cameras such as Polaroid's most recently introduced Pronto Land Camera which also utilizes Polaroid's SX-70 type film.

Since certain changes may be made in the above described system and apparatus without departing from the scope of the invention herein involved, it is intended that all matter contained in the description thereof or shown in the accompanying drawings shall be interpreted as illustrative and not in a limiting sense.

What is claimed is:

1. An electronic flash unit for use with a camera of the type having a flash socket assembly adapted for receipt of a conventional multiple flash bulb array together with an electrical receiving socket spaced apart from the flash socket for accommodating the connection of a conventional remote actuator button, said flash unit comprising:
   a housing;
   a storage capacitor;
   means responsive to an applied, substantially steady stage, voltage for charging said capacitor;
   circuit means responsive to an applied trigger signal for discharging said capacitor through said discharge tube to produce an illuminating flash of light;
   a connector blade extending outward of said housing and adapted for receipt within the camera flash socket assembly, said connector blade having at least three spaced terminal elements thereon of which two terminal elements are arranged to receive an applied trigger signal from the camera and of which the third terminal element is arranged to receive one side of an applied, substantially steady state, voltage from the camera for charging said capacitor;
   means for respectively electrically connecting said trigger signal receiving terminal elements to said means for discharging said capacitor and for electrically connecting said applied voltage receiving terminal element to said means for charging said capacitor;
   a flexible electrical connecting member having a single conductive element therein extending outward of said housing and connecting to an electrical insertion jack adapted for receipt within the camera receiving socket to receive the other side of the applied, substantially steady state, voltage from the camera for charging said capacitor; and
   means within said housing for electrically connecting said conductive element to said means for charging said capacitor.

2. The electronic flash unit of claim 1 wherein the camera electrical receiving socket includes two spaced apart female type receiving chambers and said electrical insertion jack includes two spaced male type prong members adapted for receipt by the female receiving chambers of the electrical receiving socket, said single conductive element electrically connecting to only one of said male type prong members.

3. The electronic flash unit of claim 1 wherein said capacitor charging means is electrically connected to receive the negative potential side of the applied voltage from that connector blade terminal element which is arranged to receive the applied voltage from the camera and to receive the positive potential side of the applied voltage from said electrical insertion jack.

4. An electronic flash unit and camera combination comprising:
   a camera housing;
   a flash unit housing;
   a socket assembly on said camera housing for receipt of a conventional multiple flash bulb array;
   an electrical receiving socket on said camera housing spaced apart from said socket assembly for accommodating the connection of a conventional remote actuator button;
   means within said camera housing for receiving a source of electrical energy;
   means within said camera housing and energizable by the source of electrical energy for providing a trigger signal as well as one side of a substantially steady stage voltage potential to said socket assembly and for further providing the other side of said substantially steady state voltage potential to said electrical receiving socket;
   a storage capacitor within said flash unit housing;
   means within said flash unit housing responsive to an applied, substantially steady state, voltage for charging said capacitor;
   circuit means within said flash unit housing responsive to an applied trigger signal for discharging said capacitor through said discharge tube to produce an illuminating flash of light;
   a connector blade extending outward of said flash unit housing in releasable connection within said camera flash socket assembly, said connector blade having at least three spaced terminal elements thereon of which two terminal elements are arranged to receive said trigger signal from said camera socket assembly and of which the third terminal element is arranged to receive one side of said substantially steady state voltage from said camera socket assembly;
   means within said flash unit housing for respectively electrically connecting said trigger signal receiving terminal elements to said means for discharging said capacitor and for electrically connecting said applied voltage receiving terminal element to said means for charging said capacitor;
   a flexible electrical connecting member having a single conductive element therein extending outward of said flash unit housing and connecting to an electrical insertion jack in releasable electrical connection within said camera receiving socket to receive the other side of the substantially steady state voltage from said camera for charging said capacitor; and
   means within said flash unit housing for electrically connecting said conductive element to said means for charging said capacitor.

5. The electronic flash unit and camera combination of claim 4 wherein said camera receiving socket includes two female type receiving chambers and said electrical insertion jack includes two male type prong members extending into said female receiving chambers of said electrical receiving socket, said single conductive element electrically connecting to only one of said male type prong members.

6. The electronic flash unit and camera combination of claim 4 wherein said capacitor charging means is electrically connected to receive the negative potential side of the substantially steady state voltage from that connector blade terminal element which is arranged to receive the substantially steady state voltage from the camera and to receive the positive potential side of the substantially steady state voltage from said electrical insertion jack.

7. An electronic flash unit comprising:

a housing;

a storage capacitor;

means responsive to an applied substantially steady state, voltage for charging said capacitor;

circuit means responsive to an applied trigger signal for discharging said capacitor through said discharge tube to produce an illuminating flash of light;

a connector blade extending outward of said housing and having at least three spaced terminal elements thereon wherein two of said terminals electrically connect to said means for discharging said capacitor and the other of said terminals electrically connects to said means for charging said capacitor; and a flexible electrical connecting member having a single conductive element therein extending outward of said housing and terminating in an electrical insertion jack outside of said housing, said single conductive element also electrically connecting to said means for charging said capacitor.

8. The electronic flash unit of claim 7 wherein said jack includes two spaced apart male type prong members.

9. The electronic flash unit of claim 7 wherein said capacitor charging means is electrically adapted to operate upon receipt of a ground reference potential from the connector blade terminal element to which it electrically connects and a positive potential from said electrical insertion jack to which it also electrically connects.

* * * * *